June 23, 1959  R. H. FIELDING, JR  2,892,034
VIBRATION DETECTING INSTRUMENT

Filed Nov. 15, 1957  2 Sheets-Sheet 1

INVENTOR
RALPH H. FIELDING, JR.

BY Mason, Fenwick & Lawrence
ATTORNEYS

June 23, 1959 R. H. FIELDING, JR 2,892,034
VIBRATION DETECTING INSTRUMENT
Filed Nov. 15, 1957 2 Sheets-Sheet 2

INVENTOR
RALPH H. FIELDING, JR.

BY *Mason, Fenwick & Lawrence*
ATTORNEYS

United States Patent Office 2,892,034
Patented June 23, 1959

2,892,034

VIBRATION DETECTING INSTRUMENT

Ralph H. Fielding, Jr., Phillipsburg, N.J., assignor to Valley Engineering Corporation, Easton, Pa., a corporation of Pennsylvania Application November 15, 1957, Serial No. 696,723

4 Claims. (Cl. 179—1)

The present invention relates in general to devices rendering internal sounds and vibrations in apparatus readily discernable, and more particularly to transducer devices for converting vibratory and sonic signals to audio frequency electrical signals, amplifying them, and producing an audible output signal representative of the vibratory and sonic signals.

An object of the present invention is the provision of a novel instrument for producing an audible output signal representative of vibrations and internal sounds in test objects, which is of simple and durable construction facilitating use by workmen without special training, and which is a physically compact assembly facilitating transportation of the instrument into the field and insertion into restricted spaces.

Another object of the present invention is the provision of a novel device for rendering the internal sounds and vibrations of machinery readily detectable by servicemen and workmen, which is a self-contained, readily portable unit characterized by great sensitivity and range of amplification.

Another object of the present invention is the provision of a device for detecting and amplifying vibration and internal sounds of machinery for trouble shooting purposes, wherein the components are housed in a novel manner facilitating manipulation of the device into restricted spaces and adjustment of the range of amplification thereof.

Other objects, advantages and capabilities of the present invention will become apparent from the following detail description, taken in conjunction with the accompanying drawings showing one preferred embodiment of the invention.

Figure 1:
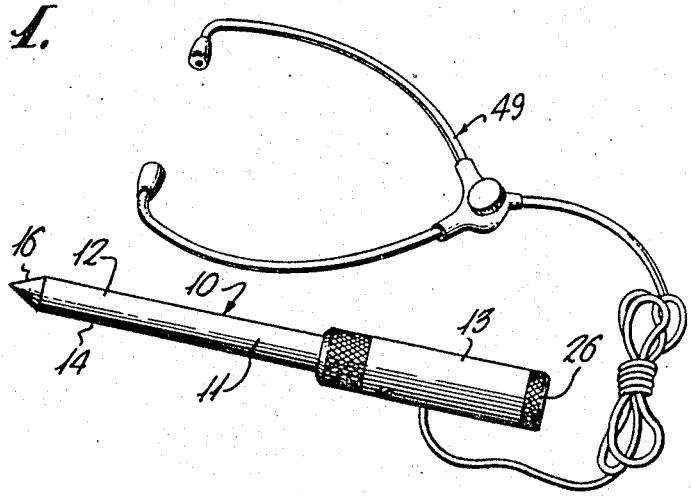
Figure 1 is a side elevation of a vibration detecting device constructed in accordance with the present invention.

Referring to the drawings, wherein like reference characters designate corresponding parts throughout the several figures, the vibration and sound detecting instrument, indicated generally by the reference character 10, is embodied in an elongated tubular housing 11 formed in two major sections, a probe section 12 and a handle section 13. The probe section 12 which is of rather small diameter to permit its insertion into restricted spaces, includes an aluminum tube 14 having a bore 15 extending the length thereof. An aluminum cone 16 is crimped or otherwise fixed in the outer end of the tube 14 to close the outer end of the tube and form the point of the instrument which is to be placed in physical contact with the test object from which vibration signals are to be received. The opposite end of the tube 14 is press fitted into a complementary bore 17 in an annular knurled bushing 18 forming the head of the handle section 13. A tubular shell 19, preferably of aluminum, is fitted at its forward end onto a reduced diameter neck 20 of the bushing 18 and is fixed on the bushing 18 by screws 21 threaded into drilled and tapped openings therefor in the bushing 18. The shell 19 forms the body of the handle and is provided intermediate its ends with a transverse, annular partition 22 having a central opening 23 therein. The partition 22 is held in place in the shell 19 in any suitable manner, as by crimping or the like, and divides the bore of the shell 19 into a forward chamber 24 and a rearward chamber 25.

A cylindrical control knob 26 closes the rearward end of the shell 19 and forms the butt end of the handle section 13. The control knob 26 has a larger diameter portion 27 substantially corresponding to the outer diameter of the shell 19 which may have a knurled periphery to facilitate adjustment thereof, and an annular flange 28. The flange 28 has an outwardly facing cylindrical surface of a diameter closely approximating the inner diameter of the shell 19 to be supported by and rotatably journaled in the rear end of the shell 19 and an inwardly facing cylindrical surface of smaller diameter bounding a cylindrical well to receive the open end of a cylindrical battery case 29 of dielectric material. The battery case 29 is fixed to the flange 28 of the control knob 26 to be supported thereby and rotate with the knob 26 by diametrically opposed screws 30 which are threaded through the flange 28 and into tapped openings in the battery case 29. The battery case 29 has a hollow bore 31 for accommodating a battery cell 32 and a spring 33 in electrical communication with a contact 34 and the base electrode of the cell 32 and urging the cap electrode of the cell 32 into contact with an anode contact 35.

Within the forward end of the tube 14 of the probe section 12 is housed a piezo-electric crystal transducer cartridge 36 to which the vibrations or sounds picked up from the test object by the cone 16 are transmitted by a length of shaped steel wire 37. The mechanical vibration or sound is transduced to an electrical signal having a frequency corresponding to or proportional to the vibration or sound in a well known manner by piezo-electric effect involving stressing of the crystal, and these electrical signals are transmitted through leads 38, 39 to an amplifier cartridge 40 which is likewise housed in the tube 14 rearwardly of the transducer. A gain control potentiometer 41 for the amplifier cartridge 40 is housed in the forward chamber 24 of the handle shell 19 and is of similar construction to conventional volume control switch and potentiometer units employed in radios and the like having a cylindrical case 42 fixed to the bushing 18 having the stationary potentiometer winding therein and a rearwardly projecting rotatable spindle 43 to which the movable potentiometer contact is fixed extending through the aperture 23 in the partition 22 and into a socket 44 in the base of the battery case 29 to which the spindle 43 is keyed by a screw 45. In this way, the potentiometer spindle 43 is rotated to produce the desired gain in the amplifier 40 by rotation of the control knob 26 and battery case 29 fixed thereto. The screw 45 is made accessible to adjustment and withdrawal for disassembly of the unit by a small hole in the shell 19 aligned with the screw 45 and of sufficient size to accommodate a screw driver blade, the hole being normally plugged by a removable plug 46. Output leads 47 are led outwardly of the instrument 10 through a rubber grommet 48 to a headphone of conventional construction indicated at 49.

Figure 5:
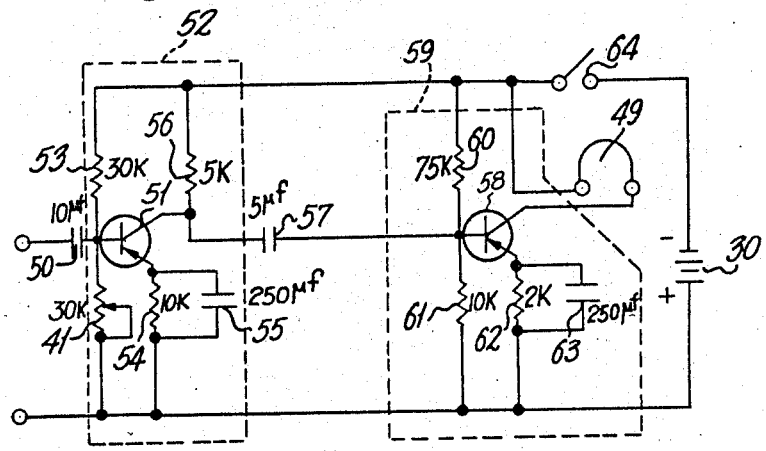
Figure 5 is a schematic diagram of an electrical amplifier circuit that may be employed in the device.
Figure 2:
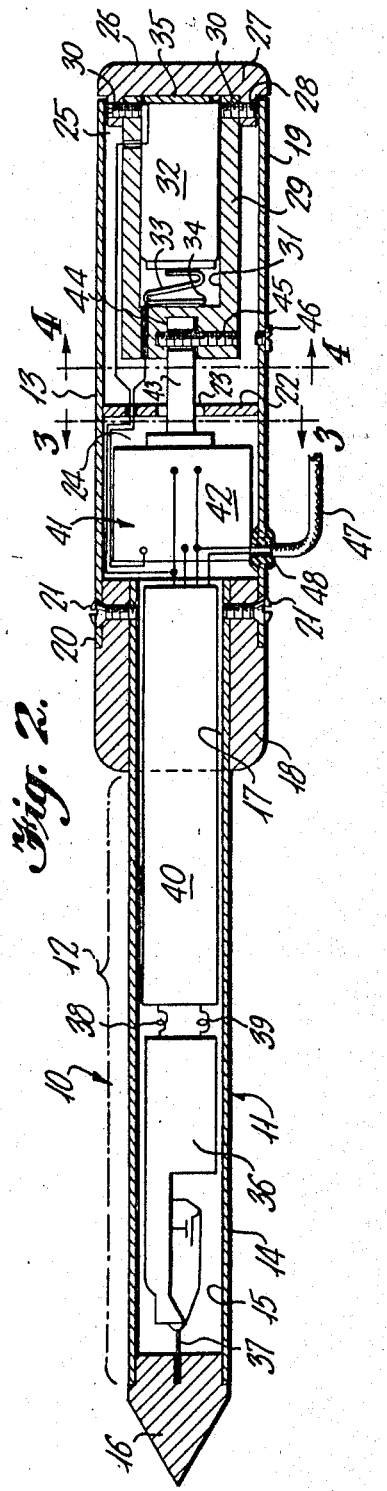
Figure 2 is a vertical, longitudinal section view thereof.
Figure 4:
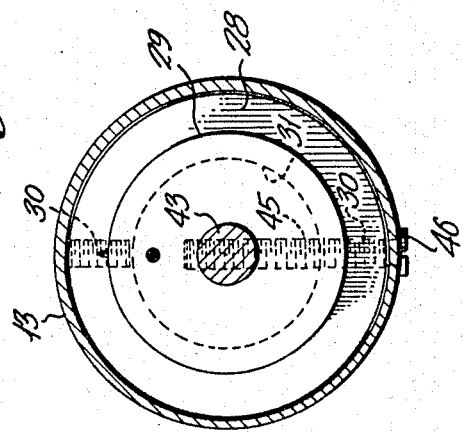
Figure 4 is a transverse section view taken along the line 4—4 of Figure 1.
Figure 3:
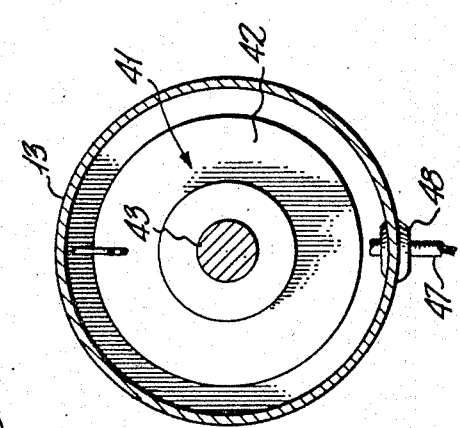
Figure 3 is a transverse section view taken along the line 3—3 of Figure 1.

A typical electronic amplification circuit that may be used in the instrument is shown in Figure 5. The amplifier there shown consists of two transistors cascaded so as to produce the desired gain. Referring to the circuit in detail, the electrical signal produced by the transducer 36 is applied through one of the leads 38, 39 and input capacitor 50 to the base of a transistor 51 in the first stage 52. Typical values for the circuit elements are indicated in Figure 5. Base bias for the transistor 51 is supplied by a voltage divider network formed of resistor 53 and the gain control potentiometer 41 connected in series across the battery 30, in combination with the emitter resistor 54 for the transistor 51. The emitter resistor 54 is by-passed by a capacitor 55. This voltage divider network provides D.C. stabilization of the first stage 52. The amplified signal output from the first stage 52 appears across the collector load resistor 56, and is coupled through interstage coupling capacitor 57 to the base of the transistor 58 in the second amplifier stage 59. The second stage 59 is also D.C. stabilized, the base bias for the transistor 58 being supplied by a voltage divider network formed of resistors 60 and 61 and emitter resistor 62 by-passed by capacitor 63. The headphone unit 49, which may be a Telex type #4626 with a 2000 ohm coil is interposed in the collector circuit of transistor 58 and acts as the second stage collector load resistor across which the final output signal appears. The switch 64, which is physically incorporated in the gain control potentiometer unit 41 as previously mentioned, serves to turn on and off the power to the circuit.

In the use of the vibration detecting instrument 10, the operator will place the earphones 49 in his ears and rotate the control knob 26, which in turn rotates the battery case 29 and gain control potentiometer spindle 43, to close the switch 64 and supply power to the amplifier stages 52 and 59. The cone 16 of the instrument will then be placed in contact with the test object to physically couple mechanical vibration, resulting from vibration or sound within the test object through the steel wire 37 to the crystal transducer cartridge 36 to stress the crystal and produce electrical signals related to the vibrations. These electrical signals are then coupled through the coupling capacitor 50, amplified by the successive cascaded transistor amplifier stages 52 and 59, and appear as audible signals at the earphones 49. The gain of the amplifier unit 40 is adjusted to the desired setting by rotating the control knob 26 and battery case 29 and potentiometer spindle 43 coupled therewith to regulate the position of the movable contact of potentiometer 41 and the base bias on transistor 51. The instrument provides a most versatile trouble shooting tool which is useful in general machinery inspection, checking gear trains without disassembling, and like applications, and facilitates location of trouble spots in automotive motors, transmissions, and body squeaks and rattles, and in electric motor bearing housings and the like. It also is useful in monitoring the flow of liquids through pumps or pipes for test or servicing.

While only one embodiment of the invention has been particularly shown and described, it is apparent that other modifications may be made in the invention without departing from the spirit and scope thereof, and it is desired, therefore, that only such limitations shall be placed thereon as are imposed by the prior art and are set forth in the appended claims.

What is claimed is:

1. A vibration detecting instrument for transducing and amplifying vibration in a test object comprising a cylindrical handle having an internal bore extending substantially the length thereof and opening rearwardly of the handle, a probe portion projecting forwardly of the handle in axial alignment therewith having an elongated tube fixed at its rearward end to said handle and a probe tip at the forward end of the tube closing the forward end, a transducer in said tube means for communicating vibration imparted to said tip to said transducer to produce transduced electrical signals, amplifier means in said tube for amplifying said signals, a rotary arm potentiometer within said handle bore having a winding fixed against movement relative to the handle and a rotatable spindle projecting rearwardly along the bore axis for adjusting the contact arm, a control knob in the shape of a disk having a diameter corresponding to the diameter of the handle forming a rear closure for the handle bore and journaled for rotation in the handle bore, and means releasably coupling said knob to said spindle for adjustment of said spindle upon rotation of said control knob.

2. A vibration detecting instrument for transducing and amplifying vibrations of a test object comprising a housing having a probe section and a handle section, said probe section including an elongated tube having front and rear ends, a tip member fixed to the front end of said tube to be placed in physical contact with the test object, a transducer within said tube for producing electrical signals in response to stressing thereof, a rigid connector for transmitting vibration picked up by said tip member to said transducer to stress the latter, amplifier means for amplifying said electrical signals, said handle section including an annular member rigidly fixed to said tube at the rear end thereof, a shell fixed to said annular member and projecting rearwardly therefrom providing a rearwardly opening bore, a rotating arm potentiometer in said shell being a fixed case and a rotatable spindle for adjusting said arm projecting rearwardly along the axis of said shell, a control knob forming a rear closure for said shell and journaled for rotation in the rear end of said bore of said shell, and means releasably connecting said knob with said spindle for rotating said spindle in response to rotation of said knob.

3. A vibration detecting instrument for producing audible signals representative of mechanical and sound vibrations in a test object comprising an elongated tube, a transducer and amplifier means in said tube, a tip member closing the front end of said tube to be placed in contact with the test objects, a substantially rigid connector for transmitting vibration for said tip member to said transducer to activate said transducer to produce electrical signals related to said vibrations, a handle connected to the rear end of said tube comprising an annular bushing surrounding a portion of said rear end and fixed thereto, a hollow shell fixed to said bushing and projecting rearwardly therefrom defining a rearwardly opening bore, a cylindrical potentiometer unit fixed to said bushing in said bore and having a movable contact spindle projecting rearwardly within said bore in registry with the axis of said shell, a disk shaped control knob journaled in the rear end of said bore and rotatable about the axis of the bore, a battery case removably fixed to said knob and projecting into said bore, said case including a base remote from said knob having a socket therein removably receiving the free end of said potentiometer spindle therein, and means removably locking said spindle with said case to be adjusted in accordance with rotation of said knob and said case.

4. A vibration detecting instrument for transducing and amplifying vibrations in a test object comprising a cylindrical handle, a probe projecting forwardly of the handle in axial alignment therewith comprising an elongated cylindrical tube, a conical metallic tip press fitted to said tube at the end of said tube remote from said handle and forming a closure for said remote end, a transducer cartridge housed in said tube, a steel wire extending between said conical tip and said transducer cartridge for transmitting vibrations imparted to said tip upon contact of the tip with the test object to said transducer cartridge to activate the latter to produce proportional electrical signals, an amplifier cartridge in said tube for amplifying said signals, said handle comprising an annular bushing press fitted to the adjacent end of said tube, a cylindrical shell fixed to said bushing and having an outer diameter corresponding substantially to the outer diameter of said bushing projecting in a direction opposite to said probe and forming a cylindrical housing chamber, a rotary arm cylindrical potentiometer fixed within said chamber having the windings held against movement and a rotatable contact arm controlling spindle projecting rearwardly along the axis of the bore for adjusting the contact arm of the potentiometer, a disk-shaped control knob having a diameter corresponding to the outer diameter of said shell forming a rear closure for said shell and journalled for rotation therein, a cylindrical battery case removably fixed to said control knob and projecting into said chamber in axial alignment therewith, said battery case including a base remote from said control knob having a socket therein opening toward and receiving the free end of said potentiometer spindle, threaded locking means in said base of said battery case projecting into said socket for fixing said spindle against rotation relative to said battery case whereby the contact arm of said potentiometer may be adjusted by rotation of said control knob, means connecting said potentiometer with said amplifier cartridge for adjusting the gain of said amplifier cartridge, and headphone means disposed externally of the instrument for rendering the output signals of said amplifier cartridge audible.

References Cited in the file of this patent

UNITED STATES PATENTS

| | | |
|---|---|---|
| 1,686,138 | Marvel | Oct. 2, 1928 |
| 1,988,001 | Flanders | Jan. 15, 1935 |